Dec. 18, 1956  L. H. MORIN  2,774,398
METHOD OF PRODUCING PLASTIC RIM SPOOLS
Filed March 5, 1951
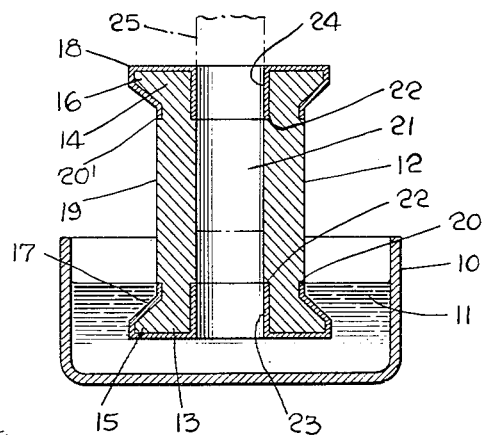
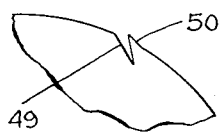
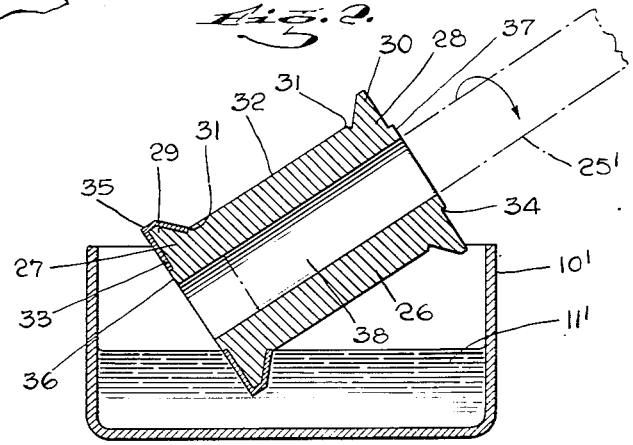
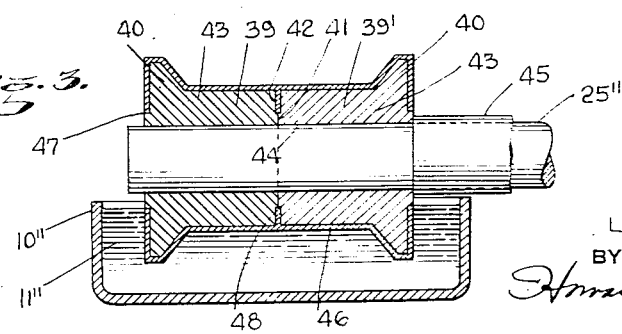
INVENTOR
LOUIS H. MORIN
BY
ATTORNEY United States Patent Office 2,774,398
Patented Dec. 18, 1956

2,774,398

METHOD OF PRODUCING PLASTIC RIM SPOOLS

Louis H. Morin, Bronx, N. Y., assignor to Coats & Clark Inc., a corporation of Delaware Application March 5, 1951, Serial No. 213,968

7 Claims. (Cl. 144—309)

This invention relates to the production of spools having plastic coatings thereon and, particularly, on the rim or flange portions of the spools to strengthen said rim or flange portions to facilitate the formation of the thread or strand holding nick or notch therein, so as to prevent chipping or rupture. More particularly, the invention deals with a method, wherein a spool or pair of spool parts are partially submerged in a heated plastic in the application of the plastic coating thereto and, wherein, the spool or spool parts can be rotated in the submerging or dipping thereof to distribute the plastic coating over predetermined areas of the spool and, further, wherein the means for rotating the spool can be utilized to displace excess plastic through the action of centrifugal force.

The novel features of the invention will be best understood from the following description, when taken together with the accompanying drawing, in which certain embodiments of the invention are disclosed and, in which, the separate parts are designated by suitable reference characters in each of the views and, in which:

Fig. 1 is a diagrammatic sectional view illustrating one method of applying plastic coatings to end portions of a spool.

Fig. 2 is a view similar to Fig. 1 showing another method of procedure.

Fig. 3 is a view similar to Figs. 1 and 2, showing another method of procedure in simultaneously coating and joining two spool halves; and Fig. 4 is a fragmentary end view of a spool showing a nick therein.

In accordance with methods disclosed in Ser. No. 213,122, filed February 28, 1951, and Ser. No. 213,123, filed February 28, 1951, now Patent No. 2,683,572, I disclose means for injection moulding or casting thermoplastics on spool bodies for the purpose of forming non-chippable rim or flange portions, as well as for purposes of otherwise modifying the structure of the spools.

My present invention deals with what might be termed a dipping or submerging method, wherein end portions of a spool are submerged in a body of plastic in the application of the film coating of the plastic thereon or, wherein, the major portion of the spool may be rotated in a plastic body to completely coat most of the exterior surfaces of the spool, which latter method can be further utilized as a means for assembling two spool halves.

In Fig. 1 of the drawing, I have diagrammatically indicated at 10 a vat, tank, trough or the like, in which plastic or similar coating fluid 11 is adapted to be arranged, this material being maintained in fluid or substantially fluid state through heating means or through solvents, in any desired manner so as to facilitate quick drying of the film coating applied to a spool 12, or common end portions 13, 14 thereon. The end portions 13, 14 of the spool in the construction shown include extending annular rings or flanges 15, 16, respectively, and these are cut-back sufficiently to receive thin film coatings 17 and 18 in such manner that these coatings will lie flush with the outer surface 19 of the spool, as indicated at 20. The bore 21 of the spool is also preferably recessed at its ends, as indicated at 22, so that the portions 23 and 24 of the coatings 17 and 18, which extend into the recessed portions 22 of the bore, will be flush with the bore 21 in the manner indicated.

At 25 I have indicated in dot and dash lines part of a spindle or mandrel, on which the spool 12 can be frictionally supported in the operation of moving the spool into the tank or the like 10, to such position to submerge an end of the spool up to the positions 20, 22 in applying the coatings 17 and 18 thereto, it being understood that these coatings are independently applied by dipping the opposed ends of the spool into the coating material 11. With the structure shown in Fig. 1, the operation may simply be a dipping operation and, in other instances, it may be desirable to rotate the spindle or mandrel 25 and, with some types of film-forming materials, it will be desirable to rotate the spool after the film coating has been applied thereto and, when the spool is arranged above the surface of the fluid 11, so as to displace excess fluid by the action of centrifugal force.

At this time, it might also be brought out that, in the different methods, as herein later disclosed, a multiple dipping or submerging operation may be performed to control the thickness of the film deposit on the spool body.

In Fig. 2 of the drawing, I have diagrammatically illustrated a method, generally similar to that illustrated in Fig. 1, in which 10' represents the container for the fluid film forming material 11' and at 26 is shown a spool body mounted on a spindle or mandrel 25' which is angularly disposed with respect to the container 10', for purposes later described.

The spool body 26 has end portions 27, 28 provided with circumferential flanges or rims 29 and 30. These rims are formed to receive the film coatings and the cylindrical body of the spool, where it joins the flanged ends, is notched, as seen at 31, so that no ridge or projection prevails on the surface 32 of the spool body.

In Fig. 2, the outer surfaces of the ends 27, 28 of the spool are recessed, as seen at 33 and 34, so as to maintain the film coatings, one of which is seen at 35, flush with the ends 36, 37 of the spool body. In Fig. 2, the bore 38 of the spool body is continuous, in other words, does not include recesses, as with the construction shown in Fig. 1.

In carrying out the method, as disclosed in Fig. 2, one of the rims or flanges is submerged in the fluid 11', in the manner indicated, and the spool 26 is rotated, which will result in applying the film coating 35 thereto and, after one end of the spool has been coated, the other end 28 will be similarly coated. With the method, as shown in Fig. 2, it will be understood that the same method of procedure will be carried out as with the structure of Fig. 1, namely in raising the complete spool from the surface of the material 11' and rotating the spool to remove excess coating material.

In Fig. 3 of the drawing, I have shown another method of procedure and, in this figure, 10" illustrates a tank or receptacle, in which coating material 11" is arranged and, at 25", is shown a spindle or mandrel, on which two similar spool halves 39, 39' are frictionally supported. As these spool halves are of identical construction, the brief description of one will apply to both. Each spool half comprises an outer flanged or rim end 40 of the general contour usually provided on spools of the kind under consideration and the inner adjacent ends of the spool halves have abutting surfaces, as at 41, outwardly of which are recessed surfaces 42, which open through the periphery of the body portion 43 of the spool. The body portion 43 has common bores 44. In applying the spool halves to the spindle or mandrel 25", they are frictionally held thereon, so as to maintain the spool halves 39, 39' in abutting engagement at 41 and one spool half 39' is preferably arranged in abutting engagement with a sleeve 45. This sleeve can be moved longitudinally of the spindle and utilized to eject the submerged product from the spindle when the product is raised above the tank or receptacle 10".

With the method as disclosed in Fig. 3 after the spool halves have been mounted and frictionally or otherwise supported on the spindle 25", the spindle is lowered to submerge the spool halves in the coating material 11" to the extent diagrammatically illustrated in Fig. 3 and the spindle or mandrel 25" is rotated to rotate the spool in the coating material and, as a result, a unitary body of film coating 46 will be applied to the entire outer surface of the spool halves 39, 39' up to a position 47 closely adjacent the sleeve 45 and this coating also extends into the recesses 42 to form a binding and reinforcing portion 48 between the spool halves at the juncture 41. With this method of procedure, in addition to coating the flange or rim ends 40, the body portion 43 of the resulting spool will be coated, as well as the surfaces of the ends of the spool body. Here again, the coated product is raised with respect to the tank or receptacle 10" and rotated for removal of excess coating material.

In the present illustrations, I have diagrammatically referred to the handling of individual spools on individual spindles. It will be apparent, however, that in a productive sense, an apparatus can be employed utilizing several spindles, wherein the process may be more or less continuous, that is to say, wherein spool blanks will be attached to one spindle, while another spindle is in the process of applying coatings to the bodies and still another spindle may be passing through an ejector stage.

While my invention deals primarily with the application of plastic coatings to spool bodies for the purposes herein stated, it will be understood that the method herein disclosed also includes the step of preliminarily forming a flanged spool having a turned-down portion on one or both flanged ends, such as the spool 26 of Fig. 2 having the recesses or turned-down portions 33 and 34; or the spool 12 of Fig. 1 having the turned-down or recessed bore portion 22 as well as the recessed or turned-down flange portions; or the spool halves 39 and 39' of Fig. 3 having the turned-down abutting end surfaces 42 as well as the recessed flange portions. With molded spools, which may be of the kind described in the above mentioned applications, this forming step of course may be done by means of an appropriately shaped mold or molds, while with wood spools a fabricating step may be necessary. The method also includes the nicking of the flanged end of the spool by cutting through the solid plastic rim thereon to form a thread holding nick. In Fig. 4 of the drawing, I have diagrammatically shown a nick at 49. In forming the nick, part of the plastic is raised, as at 50 to guide the thread end into the nick. As will be appreciated, the plastic rim permits the nicking step to be accomplished without danger of chipping the spool flange, and the nick so produced is not subject to chipping as are nicks of conventional spools.

The fluid plastic may be applied to the spool by spraying as well as by dipping.

With regard to Fig. 3, it will be further appreciated that the parts of the spool will be held together, at least partially, by the plastic envelope which surrounds the entire spool. In some cases the joining effect of such envelope may be relied upon entirely to keep the spool parts together, while in other cases the cementing action of the portion 48 may provide the sole joining means.

While my process deals primarily with the application of fluid coatings which can dry or set quickly at more or less room temperatures, it will also be understood that coating materials can be utilized to require special temperature treatment for cooling or setting and, in such instances, the spindles or mandrels can be utilized in conveying or passing the coated bodies through treatment stages for the quick setting or hardening of the coating material employed.

Having fully described my invention, what I claim as new and desire to secure by Letters Patent is:

1. The herein described method of forming a spool which consists in mounting a spool body on a mandrel disposed at an acute angle to the surface of a settable coating fluid, submerging a flange end of the spool body in the coating fluid to an extent submerging one corner portion only of a flange end, rotating the mandrel and spool body, thus submerged, to apply a ring-like deposit of the fluid on the flange end of the spool body, thus completely enveloping the flange thereof, then raising the spool body above the level of fluid while continuing rotation of said body to displace excess fluid, leaving a deposit of the fluid on said spool body, setting the deposit, and nicking said flange end of the spool body by cutting through the set deposit to form a non-chippable, thread-holding nick in said end.

2. The herein described method of forming spools which comprises forming two spool body parts adapted to abut each other to produce a spool body, said abutting parts having a recess partly separating them, mounting said spool body on a mandrel, moving the mandrel so as to submerge a portion of the spool body in a fluid, rotating the mandrel and spool body in said fluid to apply a film coating of the fluid to the submerged portion of the spool body and to fill said recess with fluid, then moving the mandrel and spool body to position the spool body above the level of fluid, while continuing to rotate said body to remove excess fluid and leave a film deposit of the fluid on the surfaces of the spool body initially submerged and rotated in the fluid, and utilizing the film coating to unite the separate parts of said body.

3. The method of producing a thread spool having a non-chippable thread nick therein which comprises forming a flanged spool having a turned-down portion on at least one flanged end thereof, immersing at least a portion of the turned-down end of the spool in a reservoir of fluid plastic to form a coating on said end of such thickness as to fill up said turned-down portion, removing the end from the reservoir, rotating the spool to remove excess fluid plastic from said end, setting the plastic coating to form a solid plastic rim on said end, and nicking the spool by cutting through the solid plastic rim thereon to form a non-chippable, thread holding nick.

4. The method of producing a thread spool having a non-chippable thread nick therein which comprises forming a flanged spool having a turned-down portion on at least one flanged end thereof and on the bore portion of said end, immersing the turned-down end of the spool in a reservoir of fluid plastic to form a coating on said end of such thickness as to fill up said turned-down portion, removing the end from the reservoir, rotating the spool to remove excess fluid plastic from said end, setting the plastic coating to form a solid plastic rim on said end, and nicking the spool by cutting through the solid plastic rim thereon to form a thread holding nick.

5. The method of producing a thread spool having a non-chippable thread nick therein which comprises forming a flanged spool having a turned-down portion on at least one flanged end thereof, immersing at least a portion of the turned-down end in a reservoir of fluid plastic while supporting said spool at an angle relative to the surface of said fluid plastic, rotating the spool in said reservoir to form a coating on said flanged end of such thickness as to fill up said turned-down portion, removing the end from the reservoir, rotating the spool to remove excess fluid plastic from said end, setting the plastic coating to form a solid plastic rim on said end, and nicking said flanged end of the spool by cutting through the solid plastic rim thereon to form a thread holding nick.

6. The herein described method of forming spools which comprises forming two spool parts adapted to abut each other to produce a spool, mounting said spool on a mandrel, moving the mandrel so as to submerge a portion of the spool in a fluid plastic material, rotating the mandrel and spool to apply a film coating of the plastic material to the submerged portions of each said part of the spool, then moving the mandrel and spool to position the spool above the level of plastic material while continuing to rotate said spool to remove excess plastic material and leave a deposit of the plastic material on the surfaces of the spool initially submerged, and utilizing the said deposit to unite the separate parts of said spool.

7. The method of uniting two members which consists in forming a recess between abutting surfaces of said members, mounting said members on a mandrel in abutting engagement with each other, sumberging portions of said members in a fluid plastic material, rotating the mandrel and members to coat the submerged surfaces of the members and to fill said recess with said plastic material, setting the plastic material on the members, and thereby joining said members together by means of said coating and said plastic-filled recess.

References Cited in the file of this patent

UNITED STATES PATENTS

| | | |
|---|---|---|
| 797,702 | Nutting | Aug. 22, 1905 |
| 1,999,259 | Rozema | Apr. 30, 1935 |
| 2,273,250 | Charlton | Feb. 17, 1942 |
| 2,386,828 | Wilcox | Oct. 16, 1945 |